(Model.)

W. M. CLOW.
BARBED FENCE WIRE.

No. 285,014. Patented Sept. 18, 1883.

Witnesses.
Thos. H. Hutchins.
Wm. J. Hutchins.

Inventor.
William M. Clow.

UNITED STATES PATENT OFFICE.

WILLIAM M. CLOW, OF WHEATLAND, WILL COUNTY, ILLINOIS.

BARBED FENCE-WIRE.

SPECIFICATION forming part of Letters Patent No. 285,014, dated September 18, 1883.

Application filed January 30, 1883. (Model.)

*To all whom it may concern:*

Be it known that I, WILLIAM M. CLOW, a citizen of the United States of America, residing at Wheatland, in the county of Will and State of Illinois, have invented certain new and useful Improvements in Barbed Fence-Wires, of which the following is a specification, reference being had therein to the accompanying drawings.

Figure 1:
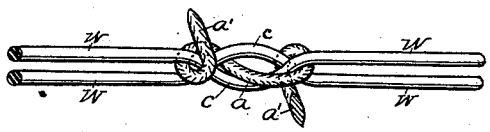
Figure 2:
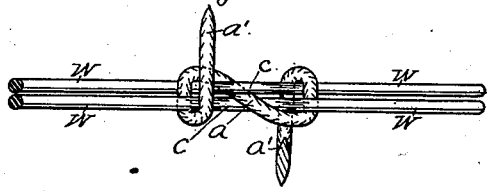
Figure 3:
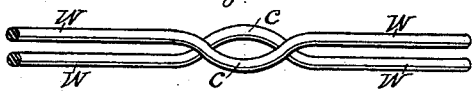

Figures 1 and 2 are perspective views of the finished barb on the strand-wires; and Fig. 3, a perspective view of the two strand-wires detached from the barb, showing the manner in which their crimps overlap each other.

This invention relates to the particular and peculiar manner in which the barb, which is formed of a short piece of wire, is applied to the strand-wires, in this instance forming, when finished, a double-strand two-pointed wire-barb for fence purposes.

Referring to the drawings, $w\ w$ represent the two strand-wires, each having a crimp, $c\ c$, as shown in Fig. 3, which crimps overlap each other, so as to leave an opening or eye between them. The barb $a$ passes through this eye between the two crimps $c\ c$, after which its prods $a'$ are bent each way on a line parallel with the two strand-wires between them, beyond the crimps $c\ c$, and through between the two strand-wires $w\ w$, as shown in Figs. 1 and 2, after which the prods are bent at right angles with the strand-wires, in opposite directions from each other, and wrapped around each separate strand-wire, which thoroughly secures the barb in its place, and ties the strand-wires together. The strand-wires are not twisted together, and need not necessarily come in contact with each other between the barbs, which prevents rusting, and is economical in not taking up wire by twisting them together. The whole forms a very neat, compact, and durable two-pointed barbed wire.

I am aware that two-pointed double-strand barbed wires are common; but I am not aware of the use of the two crimps $c\ c$ in the strand-wires adapted to overlap each other, and of the particular and new manner in which the barb is applied to and secured on the strand-wires.

I am aware that is not new to twist two wires together and bend through them a piece of wire pointed at each end, so as to present two reversely-extending loop in the middle part of said piece of wire; also, that it is not new to combine with two wires twisted together a double barb, consisting of a straight middle portion and two reversely-presented pointed ends at an angle thereto, said ends extending through or between said wires; also, that it is not new to apply a form of barb similar to that last mentioned to a pair of wires arranged side by side, but crossing at intervals where these barbs bind them together; also, that it is not new to apply to two wires twisted together a double barb having the form of a figure 8, with the ends pointed and extending in opposite directions.

Having thus described my invention, what I claim as new, and desire to secure by Letters Patent, is as follows, to wit:

The parallel wires $w$, having curved overlapping parts $c$, forming an elliptical eye, in combination with the barb-wire $a$, having its middle part wound or curved through said eye, its ends passed in opposite directions between said wires, and then bent, respectively, around each one of the same, with the points extending obliquely in opposite directions to each other, substantially as set forth.

In testimony whereof I affix my signature, in presence of two witnesses, this 25th day of January, 1883.

WILLIAM M. CLOW.

Witnesses:
 WM. J. HUTCHINS,
 THOS. H. HUTCHINS.